PULSE CHOPPER

Filed Sept. 28, 1964

INVENTOR.
BERNARR H. HUMPHERYS
BY
ATTORNEYS 3,376,432
PULSE CHOPPER
Bernarr H. Humpherys, 719 Goldenrod St., Escondido, Calif. 92025
Filed Sept. 28, 1964, Ser. No. 399,947
3 Claims. (Cl. 307—240)

ABSTRACT OF THE DISCLOSURE

A solid state pulse chopper circuit for producing a pulse output signal having a higher repetition frequency than a pulse input signal. The amplitude of output signals is proportional to that of the input signals. The most basic embodiment requires no source of external power for operation but instead is powered by the input signal itself.

The invention described herein may be manufactured and used by or for the Government of the United States of America for governmental purposes without the payment of any royalties thereon or therefor.

The present invention relates to a pulse chopper and more specifically, to a passive pulse chopper and specifically to a completely passive pulse chopper which may be used as a pulse generator, passive multivibrator, etc.

Many times in dealing with electronic circuitry an occasion arises when a device is required which will take an input waveform and chop it up into individual segments for use in other equipment or circuitry. This is ordinarily accomplished through the use of multi-vibrators or conventional choppers. These circuits, at the present time, are all active, i.e., they are triggered and run for a predetermined time and do not respond to input levels, that is to say, do not preserve the amplitude of the waveform at the input. Ordinarily, also, the multivibrators and choppers presently in use can not chop up and preserve an analog input. This is also related to the preservation of the amplitude of the input waveform. In addition, the ordinary multivibrators and choppers do not respond to a continuous DC input.

The object of the present invention is to provide an improved practical pulse chopper.

A further object of the present invention is to provide a passive pulse chopper which preserves the amplitude of the input waveform.

An additional object of the present invention is to provide a passive pulse chopper which does not require an input trigger and which will preserve the amplitude and chop a waveform connected to the waveform of the circuit.

Another object of the present invention is to provide a passive pulse chopper which utilizes standard components and is essentially maintenance-free in operation.

Other objects and many of the attendant advantages of this invention will be readily appreciated as the same becomes better understood by reference to the following detailed description when considered in relation with the figures wherein.

Figure 1:
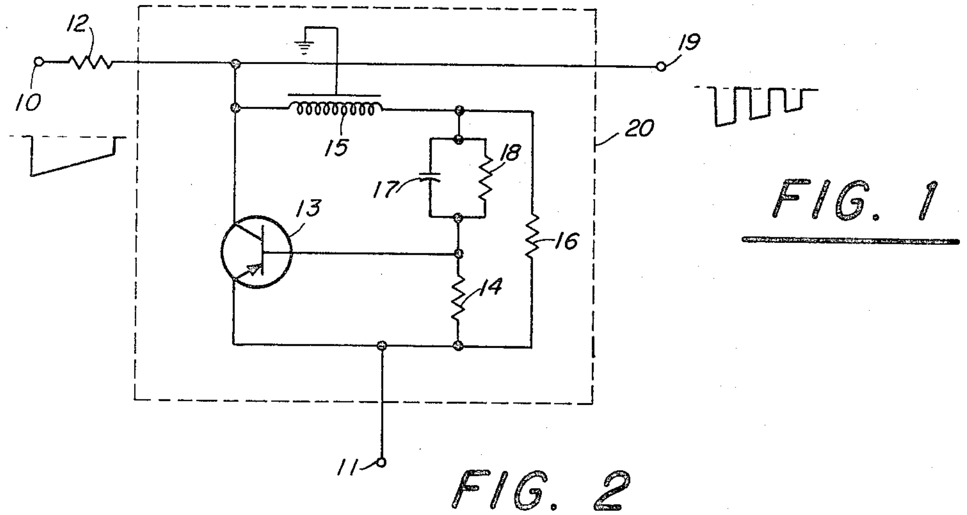
FIG. 1 is a schematic diagram of the most basic form of the invention.

FIG. 1 illustrates the most basic form of the invention. Dotted line 20 encloses what is essentially a two-terminal network. An input is adapted to be coupled to input terminal 10. Terminal 10 is connected to one side of a load resistor 12 the other side of which is connected to the collector element of a transistor 13. The load resistor 12 may be any conventional resistor and does not have to be part of the circuit within dotted enclosure 20. The emitter element of transistor 13 is connected directly to terminal 11 and the base is connected through a resistor 14 to terminal 11.

The collector of the transistor 13 is also connected through a delay line 15 to one side of the delay line characteristic impedance 16. The other side of the resistor 16 is connected to the terminal 11. The common connection of delay line 15 and resistor 16 is connected through a parallel RC combination comprising capacitor 17 and resistor 18 to the base of the transistor 13.

The common connection of resistor 12 and delay line 15, which is connected to the collector of the transistor 13, is connected as an output to terminal 19.

In operation, an input waveform is coupled in at terminal 10 through load resistor 12 to the delay line 15. At this time transistor 13 is turned "off" so that the pulse travels down delay line 15 until the leading edge is coupled through the parallel RC combination 17, 18 to the base of the transistor 13. Resistors 14 and 18 constitute a divider network and the voltage developed at the base biases the transistor 13 "on" which shorts the waveform appearing at the input of delay line 15 to the terminal 11. This terminates the pulse traveling down delay line 15 for a length of time equal to the length of delay line 15 that is, no pulse is coupled to delay line 15 until the trailing edge of the pulse clears delay line 15 and transistor 13 is turned "off." This will produce an output across terminals 19, 11 which varies periodically as the length of delay line 15.

Figure 2:
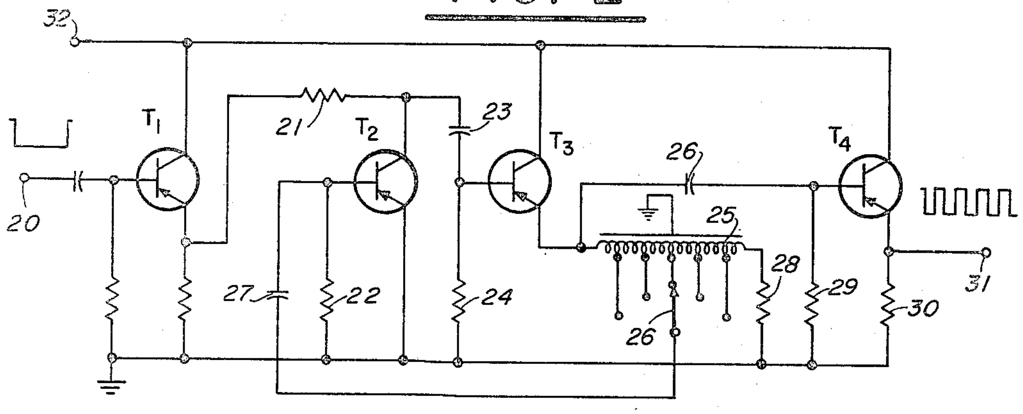
FIG. 2 is a schematic diagram of another embodiment of the invention.
Figure 3:
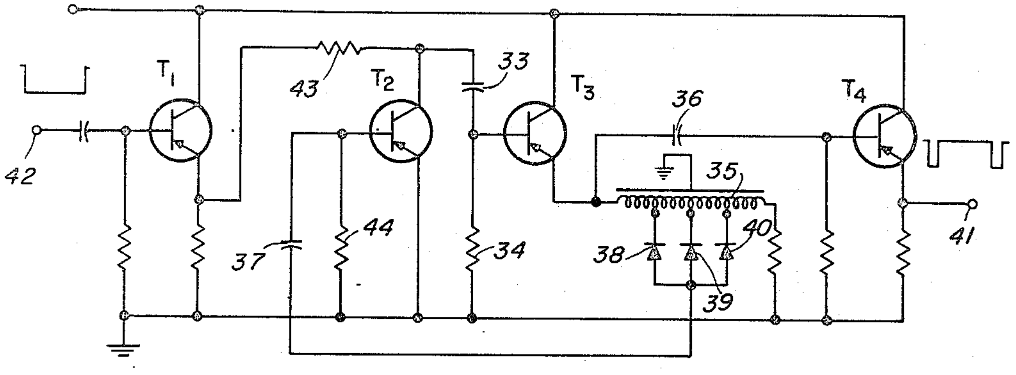
FIG. 3 is a schematic diagram of a further embodiment of the invention.

FIGS. 2 and 3 disclose essentially the same apparatus except that FIG. 3 differs over FIG. 2 in replacing a switch on the delay line by diodes so that the time between output pulses may be controlled. In FIGS. 2 and 3 $T_1$ and $T_4$ are merely buffer stages which are completely conventional.

In the embodiment of FIG. 2 an input is coupled to input terminal 20 to the buffer stage $T_1$. An output is taken at the emitter of the buffer $T_1$ and coupled through a resistor 21 to the collector of transistor $T_2$. The emitter of transistor $T_2$ is connected directly to ground and the base is connected to ground through a resistor 22. The emitter of $T_2$ is connected through a capacitor 23 to the base of transistor stage $T_3$. The base of transistor $T_3$ is also connected to ground through resistor 24.

The emitter of $T_3$ is connected to the input of a delay line 25 and also connected through a coupling capacitor 26 to the base of a transistor stage $T_4$. Delay line 25 has a multiplicity of output taps and a switch 26 which is connected through a coupling capacitor 27 back to the base of transistor stage $T_2$. Switch 26 may be positioned at any one of the output taps on delay line 25. Delay line 25 is terminated through its characteristic impedance 28 to ground.

The base of transistor stage $T_4$ is connected through resistor 29 to ground and the emitter is also connected to ground through a resistor 30. An ouput is taken at the emitter of $T_4$ and coupled to an output terminal 31. Bias is supplied to the collectors of $T_1$, $T_3$ and $T_4$ from a bias terminal 32.

In operation, a pulse is coupled in at input 20 to the base $T_1$. $T_2$ is turned "off" at this time and the pulse is coupled through $T_3$ to delay line 25. Switch 26 is adjusted so that a predetermined pulse interval is obtained, for example, a 3 microsecond pulse. The output at the emitter of $T_3$ is coupled through $T_4$ to the output terminal 31.

Let it be assumed that a 9 microsecond pulse is coupled in at input 20. $T_2$ is inhibited or "off" at this time and the leading edge of the pulse enters the delay line 25. When the leading edge of the pulse reaches the 3 microsecond tap, a pulse is coupled to $T_2$ through switch 26 and coupling capacitor 27 to the base of $T_2$ which turns $T_2$ on. This inhibits $T_3$ and the drive for delay line 25 disappears. Three microseconds after $T_3$ is turned "off" the trailing edge of the pulse clears the three microsecond tap on delay line 25 and $T_2$ turns "off." $T_3$ is turned "on" and the process repeats until the 9 microsecond pulse is chopped into theree microsecond pulses.

In FIG. 3, an input is coupled in at input terminal 30 to an emitter follower stage $T_1$ and the emitter of $T_1$ is connected through a resistor 31 to the collector of stage $T_2$. The emitter $T_2$ is connected directly to ground and the base is connected through a resistor 32 to ground. The collector of $T_2$ is also connected through a capacitor 33 to the base of another transistor stage $T_3$ and connected to ground through resistor 34.

The emitter of $T_3$ is connected as one input to delay line 35 and also connected through a coupling capacitor 36 to the base of an emitter follower stage $T_4$. Delay line 35 has a multiplicity of output taps and the taps are connected through diodes 38, 39 and 40, for example, through a coupling capacitor 37 to the base of stage $T_2$.

An output is taken at output terminal 41 which is connected to the emitter of emitter follower stage $T_4$.

Ordinarily the diodes 38 through 40 would have switches connected in series with them so that they could be inserted or removed from the circuit as desired.

The circuit of FIG. 3 operates in essentially the same fashion as that of FIG. 2 except that diodes 38 through 40, for instance, are provided to control the "on" time of $T_2$ and, therefore, the "off" time of $T_3$. As stated, in actual operation, there would be switches inserted in series with the diodes so that the intervals between output pulses could be controlled, i.e., the "on" time of $T_2$ could be controlled by the operator. The diodes conduct as long as the pulse is present in the delay line and $T_2$ will be turned "on" as long as any one diode conducts. In this fashion, the "off" time of $T_3$ may be controlled to be greater than the pulse input.

Through the use of the present invention a pulse chopper is provided which is completely passive and preserves the amplitude of the input pulse. An analog input may also be coupled to the input terminals and the circuit will operate to chop up and preserve the analog input, i.e., provide an analog output which has been converted into a series of pulses. Further, one may even obtain a continuous square wave generator by coupling a constant DC voltage to the input.

Obviously many modifications and variations of the present invention are possible in the light of the above teachings. It is therefore to be understood that within the scope of the appended claims the invention may be practiced otherwise than as specifically described.

What is claimed is:

1. A circuit for producing a pulse output signal having a repetition frequency higher than a pulse input signal comprising;
   - an input terminal for receiving said pulse input signal,
   - an output terminal,
   - load means connected between said input and said output terminals,
   - means connected between said output terminal and a reference potential and arranged to periodically short said output terminal to said reference potential,
   - said latter means comprising an electronic switch having at least one transistor and a delay line,

- said transistor having emitter, base and collector elements with said collector being connected to said output terminal and said emitter to said reference potential,
   - said delay line being coupled between said collector and said base and arranged to supply signals at said collector to said base after a desired delay time, the delay time of said delay line being less than the period of said pulse input signal,
   - said transistor being arranged to be forward biased by said signals from said delay line.

2. A circuit for producing a pulse output signal having a repetition frequency higher than a pulse input signal comprising;
   - an input terminal for receiving said pulse input signal,
   - an output terminal,
   - electronic switching means having first, second and third terminals and adapted to provide a conductive path between said first and second terminals when provided with a control signal at said third terminal,
   - first buffer means for supplying signals at said input terminal to said first terminal of said switching means,
   - a delay line having an input and at least one output and adapted to produce signals at its output representative of signals at its input delayed by some time interval, said time interval being less that the period of said pulse input signal,
   - a second buffer means for supplying signals at said first terminal of said switching means to said delay line input,
   - means for connecting said delay line output to said third terminal of said switching means,
   - a third buffer means coupled between said delay line input and said output terminal and adapted to pass signals from said delay line input to said output terminal,
   - whereby said switching means is rendered conductive periodically for time intervals dependent on said delay time interval of said delay line.

3. The circuit of claim 2 wherein;
   - said electronic switching means comprises a transistor having collector, emitter and base elements with said collector, emitter and base being said first, second and third terminals respectively of said switching means, and
   - each of said buffer means comprise emitter-follower transistor amplifiers.

References Cited

UNITED STATES PATENTS

| | | | |
|---|---|---|---|
| 2,900,533 | 8/1959 | Howes | 307—88.5 |
| 3,054,072 | 9/1962 | Beaulieu et al. | 307—88.5 |
| 3,067,344 | 12/1962 | Branum et al. | 307—88.5 |
| 3,098,976 | 7/1963 | Leakey | 307—88.5 |
| 3,229,190 | 1/1966 | Morrison et al. | 321—45 |
| 3,264,491 | 8/1966 | Davis | 321—45 |

ARTHUR GAUSS, *Primary Examiner.*

DAVID J. GALVIN, *Examiner.*

B. P. DAVIS, *Assistant Examiner.*